United States Patent
Chernett et al.

(10) Patent No.: US 8,212,837 B1
(45) Date of Patent: Jul. 3, 2012

(54) COLOR PROCESSING PIPELINES GENERATING A LOWER COLOR BIT-DEPTH IMAGE COMPARED TO AN UNPROCESSED IMAGE FROM A WIDE-ANGLE CAMERA

(75) Inventors: Paul Chernett, Farnborough (GB); Mark Davey, Bromley (GB); Yavuz Ahiska, Esher (GB)

(73) Assignee: Grandeye, Ltd., Guildford, Surrey (GB)

(*) Notice: Subject to any disclaimer, the term of this patent is extended or adjusted under 35 U.S.C. 154(b) by 735 days.

(21) Appl. No.: 12/244,175

(22) Filed: Oct. 2, 2008

Related U.S. Application Data

(60) Provisional application No. 60/976,908, filed on Oct. 2, 2007.

(51) Int. Cl.
*G09G 5/02* (2006.01)
*G09G 5/00* (2006.01)
*H04N 5/262* (2006.01)

(52) U.S. Cl. ............ 345/605; 345/600; 348/240.2

(58) Field of Classification Search .......... 348/208.5, 348/211.11, 221.1, 211.13, 222.1, 234–237, 348/240.2; 345/600, 605
See application file for complete search history.

(56) References Cited

U.S. PATENT DOCUMENTS

| | | | |
|---|---|---|---|
| 5,414,811 A | 5/1995 | Parulski et al. | |
| 5,986,642 A | 11/1999 | Ueda et al. | |
| 6,278,437 B1 * | 8/2001 | Iga et al. | 345/598 |
| 6,496,165 B1 * | 12/2002 | Ide et al. | 345/60 |
| 2002/0186309 A1 * | 12/2002 | Keshet et al. | 348/272 |
| 2003/0052981 A1 | 3/2003 | Kakarala et al. | |
| 2003/0234876 A1 | 12/2003 | Bloom et al. | |
| 2004/0233206 A1 * | 11/2004 | Champion | 345/531 |
| 2004/0240563 A1 * | 12/2004 | Chiu et al. | 375/240.29 |
| 2005/0046730 A1 * | 3/2005 | Li | 348/333.12 |
| 2005/0104900 A1 * | 5/2005 | Toyama et al. | 345/629 |
| 2005/0212961 A1 | 9/2005 | Matsuzaki et al. | |
| 2006/0017712 A1 | 1/2006 | Iwaki | |
| 2006/0028483 A1 | 2/2006 | Kondo et al. | |
| 2006/0269159 A1 * | 11/2006 | Kim et al. | 382/256 |
| 2007/0041057 A1 | 2/2007 | Chen | |
| 2007/0071362 A1 | 3/2007 | Milanfar et al. | |
| 2007/0188411 A1 * | 8/2007 | Takada et al. | 345/63 |
| 2007/0196095 A1 | 8/2007 | Perala et al. | |
| 2007/0211072 A1 | 9/2007 | Yoo et al. | |
| 2007/0269123 A1 * | 11/2007 | Briggs et al. | 382/254 |
| 2008/0317358 A1 | 12/2008 | Bressan et al. | |

* cited by examiner

*Primary Examiner* — Jason Chan
*Assistant Examiner* — Stephen Coleman
(74) *Attorney, Agent, or Firm* — Robert O. Groover, III; Seth A. Horwitz

(57) ABSTRACT

A wide-angle video camera which captures high-resolution images using a Bayer filter to colorize the pixels. The image is processed to generate multiple views. The camera applies color processing pipelines independently and simultaneously to each of multiple regions of the full image captured by the sensor to generate a color image of acceptable quality for human viewing. An initial color image possesses greater color bit-depth compared to the output color image.

20 Claims, 2 Drawing Sheets

Electronic PTZ Camera

Figure 1 Electronic PTZ Camera

Independent image processing pipelines
in the multiple-view camera as built

COLOR PROCESSING PIPELINES GENERATING A LOWER COLOR BIT-DEPTH IMAGE COMPARED TO AN UNPROCESSED IMAGE FROM A WIDE-ANGLE CAMERA

CROSS-REFERENCE TO RELATED APPLICATIONS

This application claims priority from provisional patent application 60/976,908, filed on Oct. 2, 2007, which is hereby incorporated by reference. The present invention is related to the following co-pending U.S. patent application: Ser. No. 12/244,172, entitled "Multiple Independent Color Processing Pipelines in a Wide-Angle Camera", filed on even date herewith and assigned to the assignee of the present invention.

FIELD OF THE INVENTION

Image processing to color the image using a preparation and color processing pipeline stage.

BACKGROUND

A new class of wide-angle lens camera system which can replace a set of mechanical narrow-angle PTZ ("Pan/Tilt/Zoom") camera systems has been described in the patent application Ser. Nos. 10/837,325 and 10/837,326, hereby incorporated by reference. This type of camera emulates a PTZ camera by modifying a distorted captured image to electronically correct the distortion and scale the image. It achieves this by first using an image sensor to capture a high-resolution image, and by then projecting regions from that captured image to emulate the views which would have been captured by a set of lower-resolution PTZ cameras.

Most current image sensors are not intrinsically colored, and so typically have an array of color filters placed on top of each pixel of the sensor such that the image captured through the color filter array resembles a mosaic, usually comprised of red, green and blue pixels. A Bayer filter mosaic is a color filter array (CFA) for arranging red blue green (RGB) color filters over a square grid of image photosensors. This arrangement of color filters is used in most single-chip digital image sensors found in digital cameras, camcorders, and scanners.

The raw colorized output is referred to as a Bayer pattern image. In this method, however, two thirds of the color data is missing for each pixel and this missing data must be interpolated or predicted from the adjacent pixels. This preparatory process, known as "demosaicing", "demosaicking", or "debayering", is covered by many patents and has an extensive academic literature (see for example http://www.visionbib.com/bibliography/motion-i770.html as of Sep. 18, 2008). The processing algorithms interpolate a complete set of red, green, and blue values for each image.

There are many other processes that may be carried out to prepare captured images for image processing, such as 'dead pixel removal' (finding flawed pixels in the sensor image and altering the captured image to compensate for them) and 'denoising' (applying statistical models to images to detect and reduce noisy elements within the image). The end product of the initial image preparation phase is usually a clean, but rather dull and flat-looking image. In stills and video cameras, the camera is normally programmed to process the sensor image such that the image is as close to being acceptable to the human eye as possible.

The subsequent image processing stage, typically referred to as the "image color processing pipeline", is designed to make the prepared image seem more "true to life" or "natural". These goals are conventionally achieved by deploying various combinations of well-known processes, including brightness enhancement, contrast enhancement, white balancing, gamma correction, saturation enhancement, and color balancing. This list of processes is not necessarily complete or sufficient in every case. The nature and scope of the components used for such image color processing pipelines are well known to those skilled in the art, with two of the most frequently cited textbooks in this area being:

Fundamentals of Digital Image Processing (1989), Anil K. Jain, Prentice-Hall

Digital Image Processing, 3rd Edition (2007), Rafael C. Gonzalez & Richard E. Woods, Prentice Hall Both are hereby incorporated by reference.

There is a growing trend in modern image sensor design to integrate both the preparation stage and the image color processing pipeline stage into a single overall design, such that what is read from the image sensor is a color-corrected, full-color image. For camera systems (such as digital still cameras) where the desired final output is precisely a single large view, this kind of integration (where, for example, the sensor exposure can be chosen to give a good overall quality image) makes perfectly good sense.

However, because the new class of camera discussed here typically use an image sensor to capture a single high-resolution image from which multiple smaller views are simultaneously generated, it is very often impossible to program the camera to produce an image that will produce an optimal set of images for all the selected regions to be extracted from that image. This is particularly true for wide-angle cameras.

Examples of applications assigned to the assignee where this technology may be applied include U.S. non-provisional patent application Ser. Nos. 10/837,325 entitled "Multiple View Processing in Wide-Angle Video Camera" and 10/837,326 entitled "Multiple Object Processing in Wide-Angle Video Camera", both of which were filed Apr. 30, 2004, and are hereby incorporated by reference. These applications claim priority to U.S. provisional patent applications 60/467,588 entitled "Multiple View Processing in Wide-Angle Video Camera" and 60/467,643 entitled "Multiple Object Processing in Wide-Angle Video Camera", both of which were filed on May 2, 2003, and are hereby also incorporated by reference.

As an example of the utility of this processing, outdoor scenes often have a bimodal or multimodal distribution of luminance with areas of sky being much brighter than areas at ground level. At any particular sensor setting, the sky might be over-exposed, with many tones represented as white and with dark areas reduced to indistinguishable dark tones. As a further example, an indoor scene may include views illuminated by daylight from windows and regions illuminated by artificial lights with very different color temperatures. Without processing, the former will most likely appear too blue and the latter too red.

A conventional narrow-field mechanical PTZ camera copes with the change between brighter and darker areas by, for example, decreasing the exposure time of the sensor or using an auto iris mechanism in the camera lens. A multi-view, wide-angle camera system is unable to use these approaches, because one of its emulated camera views may be looking at a strongly lit region at exactly the same time that another view is looking at a heavily shaded region.

The technical problem addressed is how best to build a multi-view camera system such that all of the multiple views derived from a single high-resolution captured image can be of sufficient quality. Simplifying the physics slightly, there are broadly three kinds of problems that might be encountered.

First, too much light ('over-exposure') can cause 'clipping', which is when an individual sensor pixel reaches its maximum capturable value (i.e its 'ceiling'). This is often noticeable as completely white areas in the image, where all the sensor pixels have reached the ceiling value in all channels.

Second, too little light ('under-exposure') can make the captured signal prone to 'sensor noise'. This is because conventional image sensors are effectively light-energy-accumulating statistical devices that rely on the idea that each image sensor pixel will receive a sufficient amount of light-energy to make a statistically reliable assessment of the overall light intensity, so reducing the amount of light incident on each image pixel too much makes the final accumulated result statistically unreliable. This is particularly true for image sensors with many millions of image pixels, where each image pixel can be physically very small.

Third, too few bits of accuracy (i.e. how many different levels of intensity a captured signal can be represented with) inside the image processing pipeline can cause 'quantization noise', a truncation of the signal due to the image processing pipeline's inability to represent that signal.

It should also be noted that using too many bits of accuracy would have the effect of increasing the amount of memory needed by the camera system, as well as increasing the amount of memory needed to be read from and written to by the device (i.e. its 'memory bandwidth').

It is common practice for a multi-view camera system to have a single image pipeline for the whole image, and to then project multiple regions from that image as an entirely secondary stage. Yet, this typically leads to final projected views that are subject to all three kinds of distortion listed above, which can often be unsatisfactory.

SUMMARY

The inventions disclosed here offer a substantial improvement over prior art devices by proposing a different way of constructing multi-view camera systems using a different kind of image pipeline. An initial image is generated, and then multiple views are extracted from multiple regions of the initial images. These multiple views are processed in individual pipelines contemporaneously to generate an acceptable color image.

BRIEF DESCRIPTION OF THE DRAWINGS

The disclosed inventions will be described with reference to the accompanying drawings, which show illustrative, non-limiting embodiments of the invention and which are incorporated in the specification hereof by reference, wherein.

DETAILED DESCRIPTION

Figure 1:
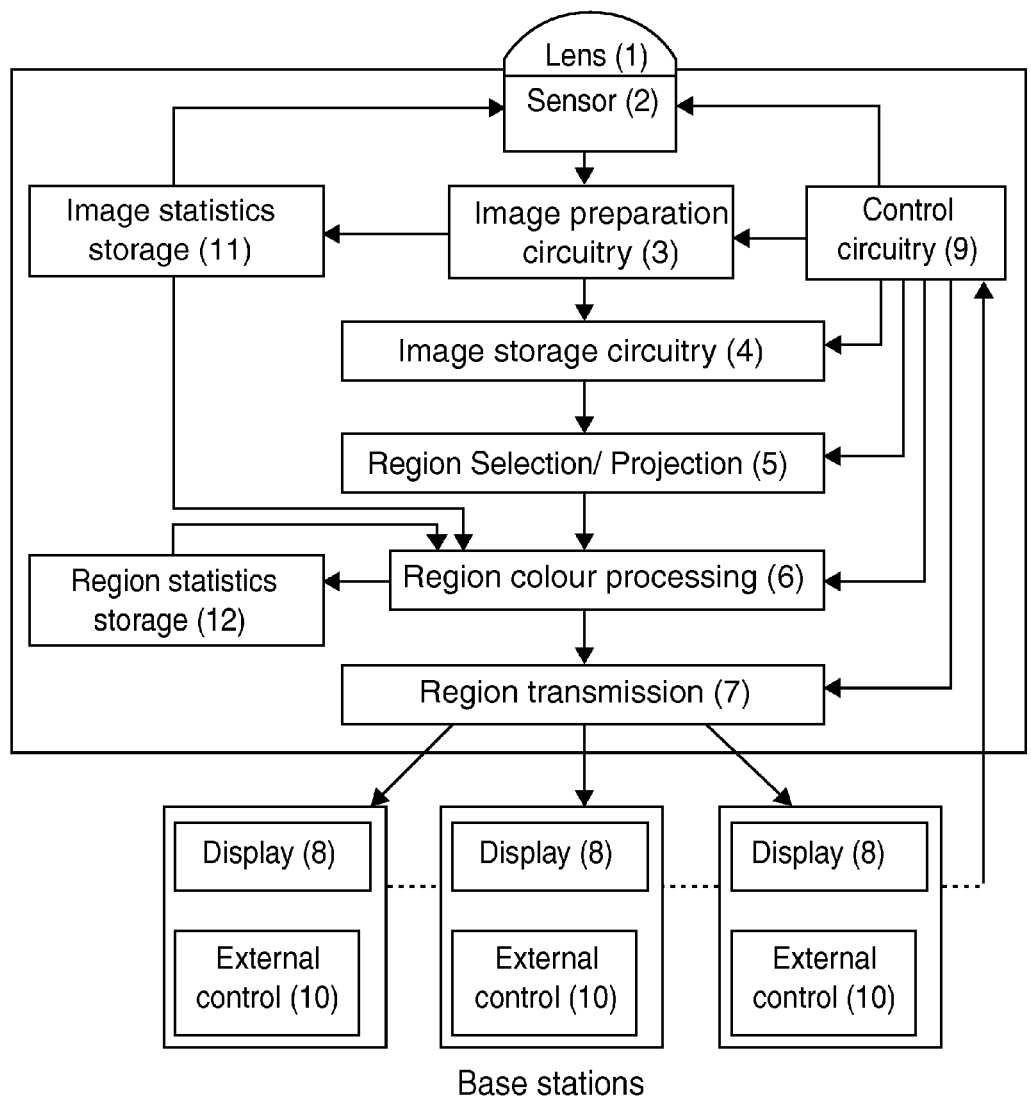
FIG. 1 shows a preferred embodiment of the image color processing in a multi-view camera with the present innovations.

A preferred embodiment shown in FIG. 1 includes a wide-angle optical lens 1, an image sensor 2, image preparation circuitry 3, image storage circuitry 4, region selection/projection circuitry 5, region color processing circuitry 6, and region transmission circuitry 7, such as an Ethernet network, or analog video cable. Images are transmitted to one or more display devices 8, for example a personal computer or an analog monitor, and the device's control circuitry 9 is itself controlled by an external control device 10, such as a personal computer or an analog joystick and keyboard. In a typical application the external control device and a display is a part of a networked remote review station. The display of such a remote review station may show different regions in multiple display windows with each separately addressed and controllable by the external control circuit device attached to the remote review station. The image sensor's 2 settings are optimized based on feedback drawn from the captured image's statistics 11, while the region color processing's 6 color processing parameters are optimized based on feedback drawn both from the image statistics 11 and from the region statistics 12.

Central to one embodiment is the idea of decomposing the image color processing pipeline into two sequential stages. Rather than having a single color processing pipeline for the whole image, only the initial image processing steps are carried out in the first stage, while per-region color processing is deferred until the second stage. A high bit-depth intermediate buffer 4 is used to communicate between the two stages.

In the first stage, the control circuitry 9 commands the sensor 2 to capture a high-resolution image and forward it to the image preparation circuitry 3. The image preparation circuitry 3 in turn both collects image statistics 11 from the image and some initial image processing to generate a full-color, high bit-depth intermediate buffer image held in the image storage circuitry (i.e. intermediate buffer) 4. The image statistics collected 11 are used to adjust the sensor settings in frames captured subsequently. Sensor settings can include exposure and gain. In the camera as currently built, the high-resolution image captured on the sensor 2 is in the well-known Bayer-format mosaic, and the image preparation circuitry 3 performs demosaicing to a 32-bit RGB image stored in the intermediate buffer 4, with 10 bits for the R channel, 12 bits for the G channel, and 10 bits for the B channel. Some initial color-balancing may also be performed in association with the demosaicing. The camera as built continually adjusts the sensor settings such that the average pixel value read from the sensor approximates to a single value, lower than would normally be used, to produce an intermediate buffer image that would normally be considered unacceptably dark if viewed directly.

The target value towards which the control circuitry should drive the average pixel value is a critical factor. In a conventional prior art camera, it is normal to control the incident light (through mechanisms such as an iris or through adjusting the exposure time) to aim to achieve an average image pixel intensity on the image sensor of 50% (or higher) of each pixel's ceiling value. However, it is more efficacious to set a target between 20% and 40% or preferably 30% as the best pragmatic target value. This corresponds to a captured image with (30/50)=60% of the typical brightness as captured by conventional cameras.

An inventive step here is the combination of a high bit-depth intermediate buffer image with a significantly lower target value for mean average pixel values than would normally be considered visually acceptable. The high bit-depth reduces quantization noise, while the lower target value reduces clipping due to overexposure, at the cost of extra sensor noise due to underexposure. The improved sensitivity in modern sensors appears to make them less prone to sensor noise than has generally been thought to be the case. The 10:12:10-bit RGB buffer format was specifically chosen because the standard Bayer color-mask has twice as many green pixels as red or blue pixels, though because the eye is so insensitive to blue light, an 11:11:10-bit RGB buffer format is also a good choice. Using 32-bits per pixel is a well-known performance optimization, specifically chosen because modern microprocessors are usually optimized for reading values from memory in multiples of 32-bits at a time.

In the second stage, multiple regions are projected from the full-color high bit-depth intermediate buffer 4 by the region selection/projection circuitry 5 to form multiple views, where each is subject to its own region color processing 6, before being sent for region transmission 7 onwards to external displays. In this second stage, multiple image processing pipelines process individual images to generate proper color adjusted images, which includes color balancing and correction. The extraction of multiple views can be accomplished contemporaneously with the color adjustment. Additional image processing techniques can also be performed, such as edge enhancement, object tracking, object recognition, scaling, and cropping.

Here, the present innovations comprise a combination of multiple pre-region image color processing pipelines 6 with a full-color high bit-depth intermediate buffer 4. The high bit-depth helps reduce quantization noise due to imprecision within the region color processing 6, as well as allowing individual regions to make subtle color correction based on region statistics 12. In the camera as built, high performance is maintained by introducing a one-frame delay between creating the region statistics 12 and their use by the region color processing 6.

Figure 2:
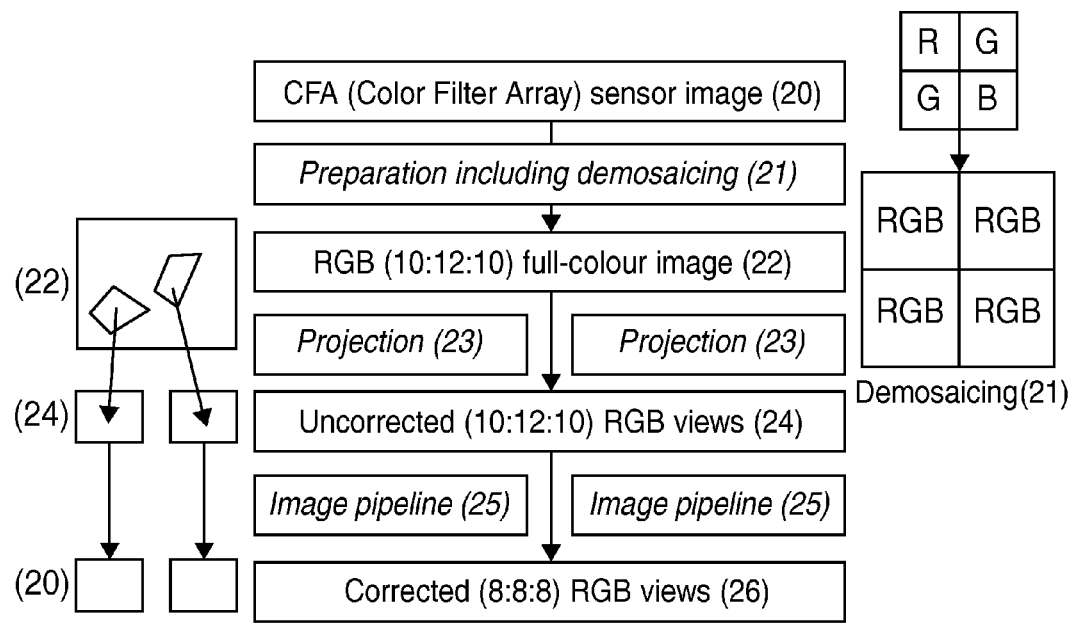
FIG. 2 shows another embodiment of the image color processing pipeline in a multiple-view camera with the present innovations.

FIG. 2 shows an embodiment of the image processing steps of the image processing pipelines of the invention. In step 20, a color filter array (CFA) sensor image is obtained. At step 21, the image preparation is performed which includes demosaicing the image to recover the two thirds of the color data missing for each pixel using the adjacent pixels. Some initial color-balancing can also be performed at this stage. This produces a full-color 32-bit RGB whole image, with 10 bits for the R channel, 12 bits for the G channel, and 10 bits for the B channel (i.e. 10:12:10 RGB) in the preferred embodiment at step 22. In step 23, the per-region color processing steps are initiated by image projection of selected regions to produce multiple images with uncorrected 10:12:10 RGB views at step 24. The images are processed by separate image processing pipelines operating simultaneously and in parallel in step 25. Step 24 and 25 can occur simultaneously (i.e., or at least contemporaneously), with image projection/extraction and image processing seamlessly integrated and accomplished. In step 26, the image processing pipelines output corrected 8-bit R channel, 8-bit G channel, and 8-bit B channel views and can include edge enhancement, object tracking, object recognition, scaling, and cropping adjustments to the image.

It should be evident to those skilled in the art that, though the preceding description is centered on its application to brightness processing in the second stage, the overall approach can be applied to any and other processes in the image processing pipeline. The examples given above are for illustration and not for limitation which is limited only by the claims appended below.

For example, in a scene partially illuminated by daylight, and partially illuminated by tungsten lighting the sensor cannot be adjusted such that both regions appear white balanced; the daylight areas would appear to be too blue and the artificially lit areas would appear too red. In the embodiment, regions exclusively lit by each illuminant would appear neutral in color temperature as each would be processed through its own independent color pipeline.

There are, of course, cases where a selected region of a scene with a bi- or multi-modal distribution of some characteristic, is itself bi- or multi-modal. Examples might be regions with both sky and land visible, or with both daylight and tungsten lit areas. In these cases neither a mechanical PTZ camera, nor a single pipeline multi-view camera system, nor a multiple pipeline multi-view camera system could (when used in combination with conventional image sensors) simultaneously show both areas correctly adjusted.

Finally, it should be understood that this present innovations do not relate to the many combinations of optical means and projective means by which views can be constructed from a wide-angle view to emulate multiple narrow-angle views, for which process there is a large prior art.

Modifications and Variations

As will be recognized by those skilled in the art, the innovative concepts described in the present application can be modified and varied over a range of applications, and accordingly the scope of patented subject matter is not limited by any of the specific exemplary teachings given. It is intended to embrace all such alternatives, modifications and variations that fall within the spirit and broad scope of the appended claims.

Different color processing models can be used other than RGB, such as CYMK (i.e., cyan, magenta, yellow, and key (black)). Other camera types can utilize the disclosed innovations. Further, different color depths can be used, such as 16-bit, 24-bit, 64-bit, etc depths.

It should also be noted that rather than the processing occurring contemporaneously in the camera, the process can be applied to a recording of an unprocessed, raw video image data from a wide-angle lens. A recording can be made from an image sensor, and the processing performed on the raw image data, or initial generated images can be recorded for subsequent processing. The processing can also be accomplished remotely from the camera on a live-feed video image.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A wide-angle video camera capable of emulating pan, tilt and zoom operations without mechanical assistance to produce multiple views, and comprising:
   a. circuitry preparing an electronically captured initial color image;
   b. intermediate buffer circuitry storing an intermediate high bit-depth initial color image, with circuitry processing the initial color image to include projecting multiple regions from the initial color image to generate multiple views and collect statistics from each of the multiple views; and
   c. circuitry incorporating multiple image color processing pipelines independently processing each of the multiple views contemporaneously, based on the statistics collected for each view, to output multiple independently processed views simultaneously;
   wherein the high bit-depth color image possesses greater bit-depth than the multiple independently processed views; and wherein the multiple views possess greater bit-depth than the multiple independently processed views.

2. The camera of claim 1,
wherein the initial color image uses 32 bits for each full-color pixel, and
wherein 10 bits represent each red channel datum, 12 bits represent each green channel datum, and 10 bits represent each blue channel datum.

3. The camera of claim 1, wherein the multiple views possess the same bit-depth as the high bit-depth color initial image.

4. The camera of claim 1, further comprising the output image using less than 32 bits for each full-color pixel.

5. The camera of claim 1, wherein in the multiple independently processed views 8 bits represent each red channel datum, 8 bits represent each green channel datum, and 8 bits represent each blue channel datum.

6. The camera of claim 1, further comprising:
image preparation circuitry collecting image statistics of the initial color image to adjust an image sensor of the wide-angle video camera such that the average pixel value on the sensor iterates toward a lower target value.

7. The camera of claim 6, wherein the collected image statistics are used to adjust the sensor such that the average pixel value in captured images iterates towards a value chosen in the range 20% to 40% of the sensor's maximum pixel value.

8. The camera of claim 6, wherein the collected image statistics are used to adjust the sensor such that the average pixel value in captured images iterates towards 30% of the sensor's maximum pixel value.

9. The camera of claim 6, wherein the collected region and image statistics are used to optimize a color processing parameter of the image color processing pipeline circuits.

10. A camera system capturing an image to produce multiple views, comprising:
an optical unit connected to an image sensor configured to capture a high-resolution wide-angle field of view;
an electronic circuit transforming the wide-angle view into a full-color initial image having a plurality of color channels;
an image processing circuit projecting multiple regions from the full-color initial image to form multiple views;
multiple image color processing pipeline circuits that independently and contemporaneously process each of the multiple views based on collected statistics to generate a respective color output image;
wherein the respective color output image uses less bit-depth datum per pixel than the full-color initial image; and
wherein the respective color output image uses less bit-depth datum per pixel than a corresponding one of the multiple views.

11. The system of claim 10, wherein the initial image is stored in an intermediate buffer before the pipeline processing using 32-bits for each full-color pixel, where 10 bits represents each R (red) channel datum, 12 bits represents each G (green) channel datum, and 10 bits represents each B (blue) channel datum.

12. The system of claim 10, wherein the multiple views use the same bit-depth datum per pixel as the full-color initial image.

13. The system of claim 10, wherein the collected statistics are used to adjust the average pixel value in the initial image to a value between 20% to 40% of the sensor's maximum pixel value.

14. The system of claim 10, wherein the collected statistics are used to adjust the average pixel value in the initial image toward 30% of the sensor's maximum pixel value.

15. The system of claim 10, further comprising:
the image processing circuit collecting statistics from each of the multiple regions;
the electronic circuit collecting statistics from the initial image;
wherein the collected image statistics are used to adjust the image sensor; and
wherein the collected region statistics and image statistics are used to generate the color output image.

16. A method for processing a wide-angle camera image, comprising the steps of:
demosaicing a captured image to partially correct multiple pixels' color and produce a high bit-depth color initial image;
projecting multiple regions from the initial image to generate multiple views; and
processing each of the multiple views with one of multiple image color processing pipeline circuits to independently, simultaneously process each of the multiple views and output the multiple independently processed views simultaneously;
wherein mean average pixel values for each of the multiple independently processed views are derived using a low target value for processing with correspondingly less color bit-depth compared to the initial image; and
wherein the multiple independently processed views have less color bit-depth compared to the multiple views.

17. The method of claim 16, further comprising the steps of:
collecting image statistics from the captured image; and
optimizing an image sensor parameter using feedback from the image statistics.

18. The method of claim 16, further comprising the steps of:
collecting image statistics and region statistics from the captured image; and
optimizing a color processing parameter in each image color processing pipeline circuit using feedback from both the image statistics and the region statistics.

19. The method of claim 16, further comprising the step of:
using 32-bits for each color initial image pixel, where 10 bits represents each red (R) pixel, 12 bits represents each green (G) pixel, and 10 bits represents each blue (B) pixel.

20. The method of claim 16, wherein the multiple views have the same bit-depth as the high bit-depth color initial image.

* * * * *